(12) United States Patent
Chilibeck et al.

(10) Patent No.: US 11,895,935 B2
(45) Date of Patent: Feb. 13, 2024

(54) APPARATUS FOR IN-SITU RECONDITIONING OF A MEDIA USED IN AN EFFLUENT TREATMENT BED

(71) Applicant: ABYDOZ ENVIRONMENTAL INC., Portugal Cove—St. Philip's (CA)

(72) Inventors: Sean Alexander Chilibeck, Vancouver (CA); Eric Tasker Cook, Portugal Cove— St. Philip's (CA); Todd Michael Herritt, Kippens (CA)

(73) Assignee: Abydoz Environmental Inc., Portugal Cove-St. Philip's (CA)

(*) Notice: Subject to any disclaimer, the term of this patent is extended or adjusted under 35 U.S.C. 154(b) by 380 days.

(21) Appl. No.: 17/278,876

(22) PCT Filed: Sep. 24, 2019

(86) PCT No.: PCT/CA2019/051365
§ 371 (c)(1),
(2) Date: Mar. 23, 2021

(87) PCT Pub. No.: WO2020/061692
PCT Pub. Date: Apr. 2, 2020

(65) Prior Publication Data
US 2022/0046845 A1    Feb. 17, 2022

Related U.S. Application Data

(60) Provisional application No. 62/737,346, filed on Sep. 27, 2018.

(51) Int. Cl.
*A01B 33/16*    (2006.01)
*A01B 33/02*    (2006.01)
(Continued)

(52) U.S. Cl.
CPC .......... *A01B 33/021* (2013.01); *A01B 33/087* (2013.01); *A01B 33/103* (2013.01); *A01B 33/16* (2013.01)

(58) Field of Classification Search
CPC ......... A01B 33/021; A01B 77/00; B09C 1/00; B09C 2101/00; C02F 3/327; C02F 2303/14
(Continued)

(56) References Cited

U.S. PATENT DOCUMENTS 2,182,095 A    12/1939  Pruyn
2,657,620 A *  11/1953  Meeks ................ A01B 33/087
                                                      172/549

(Continued)

FOREIGN PATENT DOCUMENTS

DE    2359468 A1     6/1975
EP    3257594       12/2017
JP    2003169502 A   6/2003

OTHER PUBLICATIONS

International Search Report and Written Opinion issued by the Canadian Intellectual Property Office in connection with International Patent Application No. PCT/CA2019/051365, dated Nov. 25, 2019, 10 pages.

(Continued)

*Primary Examiner* — Jamie L McGowan
*Assistant Examiner* — Audrey L Lusk
(74) *Attorney, Agent, or Firm* — Y. Artemis Lai

(57) ABSTRACT

An apparatus for in-situ reconditioning of a media used in an effluent treatment bed is disclosed, in which passage of effluent has become impeded by clogging matter within the media, the bed having been planted with vegetation having roots extending into the media. The apparatus includes a frame supporting a superstructure operable to be disposed above a surface of the bed when in operation, a pair of spaced apart arms having distal ends extending downwardly from the frame, and an agitator extending between the pair of arms and having tines for sub-surface tilling of the media. The agitator is coupled to a drive system operable to cause (Continued)

rotation thereof. A lifter bar is disposed between the arms above the agitator such that when the frame is advanced through the bed the lifter bar passes through the bed below a primary root zone of the vegetation lifting and separating the primary root zone while the agitator tills the media below causing clogging matter to be separated from the media.

20 Claims, 3 Drawing Sheets

(51) Int. Cl.
*A01B 33/10* (2006.01)
*A01B 33/08* (2006.01)

(58) Field of Classification Search
USPC .................................... 405/128.1; 299/39.2
See application file for complete search history.

(56) References Cited

U.S. PATENT DOCUMENTS

| | | | |
|---|---|---|---|
| 3,698,485 A * | 10/1972 | Trimpe | A01B 33/021 |
| | | | 172/123 |
| 3,822,656 A | 7/1974 | Lalor | |
| 3,970,012 A | 7/1976 | Jones | |
| 4,047,387 A | 9/1977 | Tamura et al. | |
| 4,113,027 A | 9/1978 | van der Lely | |
| 4,127,478 A | 11/1978 | Miller | |
| 4,398,606 A | 8/1983 | Herscher | |
| 4,586,444 A | 5/1986 | Thiessen | |
| 5,111,756 A | 5/1992 | Anderson | |
| 5,127,765 A | 7/1992 | Millgard | |
| 5,631,160 A * | 5/1997 | Bruso | E02F 5/282 |
| | | | 405/303 |
| 5,639,182 A | 6/1997 | Paris | |
| 6,497,534 B1 | 12/2002 | McCoy | |
| 6,779,948 B2 | 8/2004 | Bruso | |
| 7,975,851 B2 | 7/2011 | Kossowan et al. | |
| 8,119,009 B2 | 2/2012 | Denholm, IV et al. | |
| 2002/0012572 A1 * | 1/2002 | Bruso | B09C 1/10 |
| | | | 299/39.2 |
| 2016/0278274 A1 | 9/2016 | Lopez | |
| 2017/0034984 A1 | 2/2017 | Olsen | |

OTHER PUBLICATIONS

Autran, Adrien, European Patent Office, Extended European Search Report, in connection with related European Patent Application No. 19864202.7, dated May 11, 2022, 11 pages.

* cited by examiner

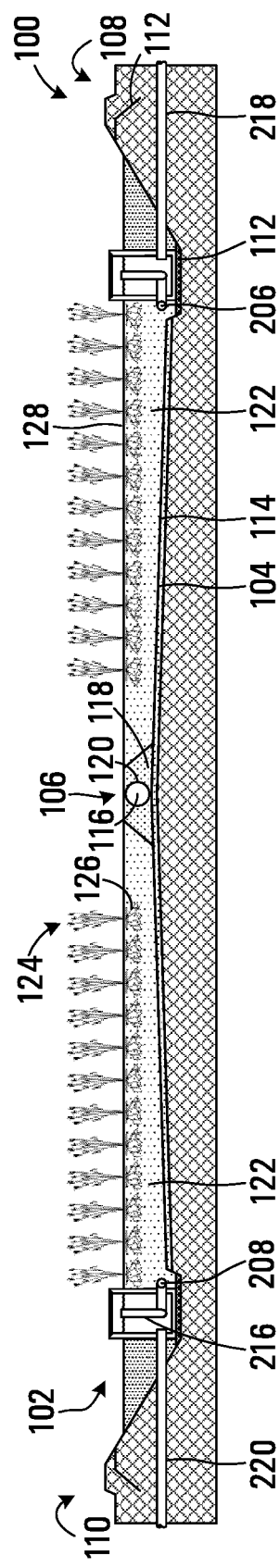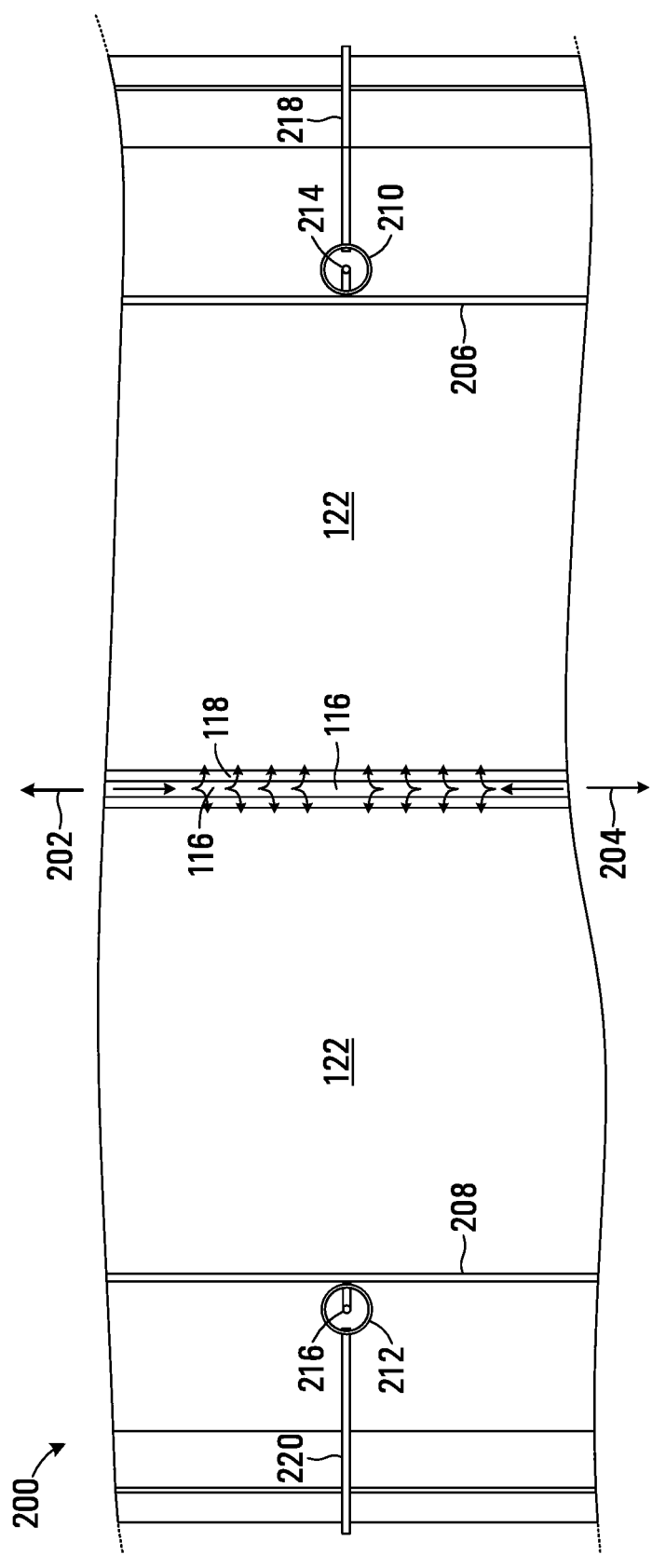

APPARATUS FOR IN-SITU RECONDITIONING OF A MEDIA USED IN AN EFFLUENT TREATMENT BED

BACKGROUND

1. Field

This disclosure relates generally to treatment of effluent using an effluent treatment bed and more particularly to reconditioning media used in the treatment bed.

2. Description of Related Art

Engineered wetlands may be used to treat municipal sewage effluent or industrial process effluent or other water based effluents. The engineered wetland is usually implemented in the form of a treatment bed having a treatment media planted with vegetation such as reeds. Effluent is passed through the treatment media and contaminants are removed through interaction with the treatment media and the roots of the vegetation.

After several years of use, the treatment media may become clogged and the treatment bed effectivity may be reduced. Maintenance of the treatment bed generally involves excavating the media which will likely severely disrupt or destroy the planted vegetation. There remains a need for methods and equipment for maintenance of engineered wetlands.

SUMMARY

In accordance with one disclosed aspect there is provided an apparatus for in-situ reconditioning of a media used in an effluent treatment bed in which passage of effluent has become impeded by clogging matter within the media, the bed having been planted with vegetation having roots extending into the media. The apparatus includes a frame supporting a superstructure operable to be disposed above a surface of the bed when in operation. The apparatus also includes a pair of spaced apart arms having distal ends extending downwardly from the frame, and an agitator extending between the distal ends of the pair of arms and having a plurality of tines for sub-surface tilling of the media. The agitator is coupled via a drivetrain to a drive system disposed within the superstructure and operable to cause rotation of the agitator. The apparatus further includes a lifter bar disposed between the arms above the agitator such that when the frame is advanced through the bed the lifter bar passes through the bed below a primary root zone of the vegetation, the lifter bar being operably configured to lift and separate the primary root zone while the agitator tills the media below the primary root zone to cause clogging matter to be separated from the media.

At least one of the pair of arms may include a liquid outlet disposed proximate the distal end and operable to introduce water into the media below the primary root zone, the introduced liquid being operable to combine with water already within the bed to increase the liquid proportion to promote separation of the clogging matter by flotation.

The agitator may include a plurality of air outlets disposed to introduce air into the media below the primary root zone, the introduced air being operable to bubble through water in the tilled media to promote separation of the clogging matter by flotation.

Each of the arms may be operably configured to be moveable upwardly or downwardly with respect to the frame to facilitate adjustment of a depth of the agitator within the bed.

The lifter bar may include a leading edge that separates the primary root zone of the vegetation from secondary roots extending into the media, and an upwardly arched surface following the leading edge that causes the separated primary root zone to be lifted to provide additional space below the lifter bar for tilling of the media by the agitator and to permit separated clogging matter to accumulate below the lifter bar.

The apparatus may include a sled coupled to the frame and disposed trailing the upwardly arched surface of the lifter bar, the sled being operable to receive the primary root zone of the vegetation for removal and disposal.

The frame may include a coupling for connection to a propulsion unit, the propulsion unit being operable to draw the frame through the bed.

The propulsion unit may be operable to supply drive power to the drive system.

The apparatus may include at least one intake disposed below the lifter bar and in communication with a pump operable to draw off water and clogging material separated from the media.

The propulsion unit may include a hydraulic fluid pump and the drive power may be supplied by supplying a flow or pressurized hydraulic fluid to the apparatus and the drive system may include at least one hydraulic motor disposed within the superstructure and operable to deliver drive power to the drivetrain.

In accordance with another disclosed aspect there is provided a method for in-situ reconditioning of a media used in an effluent treatment bed in which passage of effluent has become impeded by clogging matter within the media, the bed being planted with vegetation having roots extending into the media. The method involves causing a lifter bar of a reconditioning apparatus to be positioned within the media below a primary root zone of the vegetation such that an agitator of the reconditioning apparatus is in engagement with the media, the agitator extending between distal ends of a pair of arms ends extending downwardly from a frame of the reconditioning apparatus and having a plurality of tines for sub-surface tilling of the media. The method also involves causing the frame of the reconditioning apparatus to be advanced through the bed such that the lifter bar passes through the bed below the primary root zone of the vegetation lifting and separating the primary root zone of the vegetation while causing rotation of the agitator to separate clogging matter from the media.

The method may involve causing flotation of the clogging matter by introducing water into the media below the primary root zone.

The method may involve causing flotation of the clogging matter by introducing air into the media below the primary root zone.

The method may involve adjusting a depth of the lifter bar to a depth corresponding to a depth of the primary root zone of the vegetation.

The method may involve adjusting a depth of the agitator to a depth corresponding to a depth of the media.

The method may involve drawing off water and clogging material that has been separated from the media at a location below the lifter bar.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments,

FIG. 1 is a cross sectional view of an effluent treatment bed;

FIG. 2 is a plan view of a central portion of the effluent treatment bed shown in FIG. 1;

DETAILED DESCRIPTION

Figure 3:
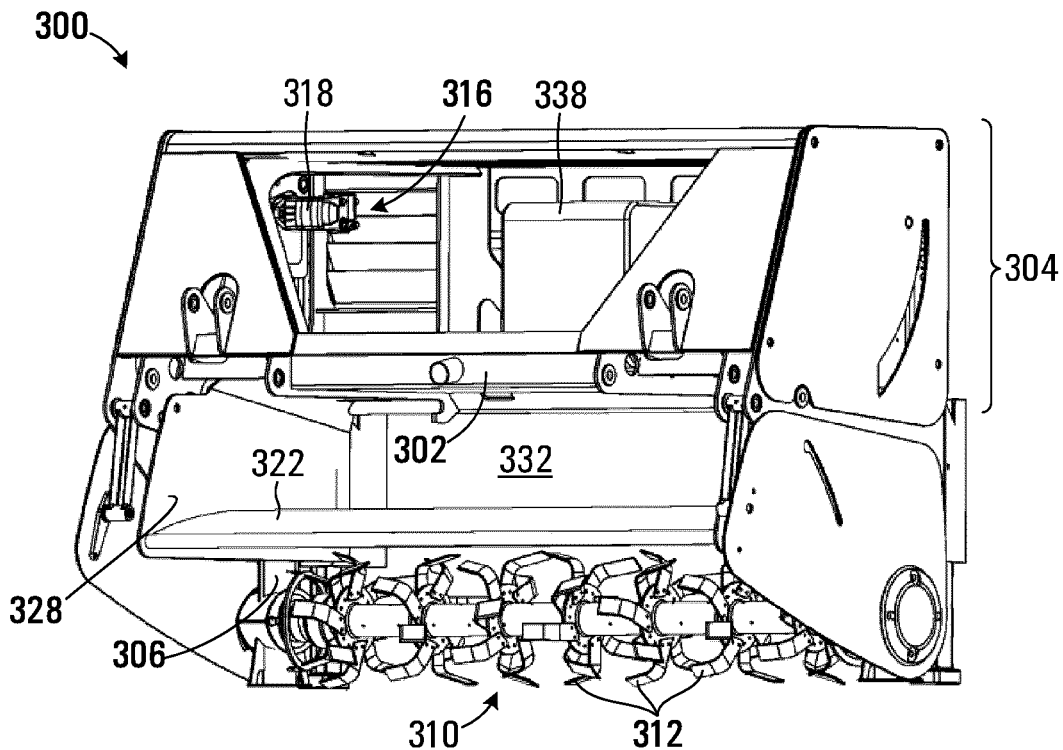
FIG. 3 is a rear perspective view of an apparatus for in-situ reconditioning of media in the effluent treatment bed shown in FIG. 1 and FIG. 2.

Referring to FIG. 1, an example of an effluent treatment bed is shown in cross section general at 100. The effluent treatment bed 100 is formed by excavating an area of land 102 in a treatment site to a shallow depth. In this example the depth of the excavated area 102 is less than about 1 meter. A base 104 of the excavated area slopes from a central region 106 toward lateral peripheral regions 108 and 110 of the excavated area 102. A bed liner 112 covers the base 104 of the excavated area 102. In one embodiment the bed liner is implemented using a high-density polyethylene (HDPE) material laid over a compacted sand layer 114 covering the base 104 of the excavated area 102. The central region 106 of the effluent treatment bed 100 includes an effluent inlet 116 disposed within a layer of gravel 118. The effluent inlet 116 may be implemented as a pipe having a plurality of perforations formed in an outer surface 120.

A portion 200 of the effluent treatment bed 100 is shown in plan view in FIG. 2. Referring to FIG. 2, the effluent treatment bed 100 extends longitudinally in both directions indicated by arrows 202 and 204, the depicted portion 200 being a middle portion of the effluent treatment bed 100. In this example, the bed has a longitudinal extent of about 55 meters in the direction of the arrows 202 and 204 and a lateral extent of about 33 meters. In practice, the effluent treatment bed 100 is sized to suit particular conditions of a site and a required treatment capacity. A treatment site may also include a plurality of individual effluent treatment beds 100.

The effluent inlet 116 extends along the full longitudinal length of the effluent treatment bed 100 and ends of the inlet (not shown) may be supplied with effluent received at the treatment site. For example, effluent may be received at a treatment site, screened to remove larger particles and objects, and then accumulated in a settling tank (not shown). The effluent may then be supplied to the effluent inlet 116 from the settling tank. In one embodiment effluent is supplied to both ends of effluent inlet 116 and the perforations in the outer surface 120 of the effluent inlet 116 may be arranged to ensure a generally uniform flow of effluent into the effluent treatment bed 100 along the longitudinal length thereof.

The effluent treatment bed 100 also includes effluent collectors 206 and 208 disposed at the lateral periphery of the effluent treatment bed 100. The effluent collectors 206 and 208 may be implemented using perforated piping extending along the longitudinal length of the effluent treatment bed 100. In the example shown, the effluent treatment bed 100 includes an effluent level regulating chamber 210 and 212 associated in communication with each of the respective effluent collectors 206 and 208. Each of the effluent level regulating chambers 210 and 212 includes a standpipe 214, 216 and a treated effluent outlet 218, 220.

The excavated area 102 between the layer of gravel 118 at the central region 106 and the effluent collectors 206 and 208 is filled with a treatment media 122. In one embodiment the treatment media may be a fractured and/or crushed gravel material specifically engineered for use in an effluent treatment bed 100. For example, the media may include a substantial proportion of 6 millimeter (¼ inch) gravel. The area between the central region 106 and the effluent collectors 206, 208 is planted with vegetation. In this embodiment the planted vegetation is in the form of a plurality of reed plants 124, each having roots 126 extending into the media 122. The roots 126 of the reed plants 124 provide a thin aerobic film around each root hair, which supplies oxygen to aerobic micro-organisms. The aerobic micro-organisms along with other anaerobic microorganisms facilitate decomposition of organic matter in the effluent.

In operation, effluent supplied to the effluent inlet 116 flows through the perforations in the outer surface 120, into the layer of gravel 118 and into the media 122. The sloped base 104 of the excavated area 102 causes effluent to pass laterally through the media 122 while being treated through contact with the media 122 and roots 126 of the reed plants 124. Treated effluent is collected at the collectors 206 and 208, and flows into the standpipes 214 and 216 in the effluent level regulating chambers 210 and 212. A height of the standpipes 214, 216 within each of the chambers 210 and 212 sets the overall level of accumulation of effluent within the effluent treatment bed 100. For example, the height of the standpipes 214, 216 may be adjusted to achieve a desired effluent level proximate a surface 128 of the media 122. When the effluent in the effluent treatment bed 100 reaches the level of the standpipes 214 and 216, collected effluent overflows from the standpipes into the chambers 210 and 212 and is discharged through the respective treated effluent outlets 218 and 220.

Over time, flow of effluent through the media 122 may become impeded due clogging matter accumulating within the media. In some cases the clogging may be sufficient to substantially impede passage of effluent through the media 122, causing the effluent treatment bed 100 to become flooded above the surface 128 and increasing the throughput of effluent through the bed.

Figure 4:
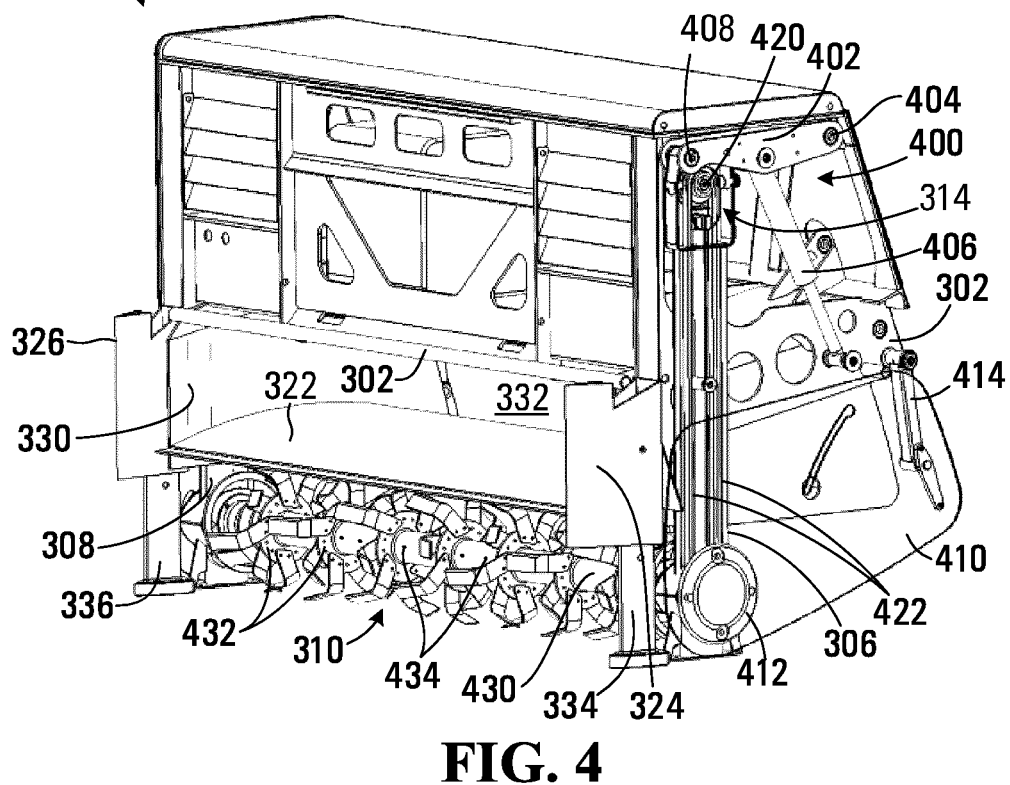
FIG. 4 is a front perspective view of the apparatus shown in FIG. 3.

An apparatus for in-situ reconditioning of the media 122 in accordance with one disclosed embodiment is shown generally at 300 in FIGS. 3 and 4. The reconditioning apparatus 300 is shown from a rear perspective in FIG. 3 and from a front perspective in FIG. 4. In FIG. 4 outside panels are shown removed to reveal structural elements of the reconditioning apparatus 300. The reconditioning apparatus 300 includes a frame 302 supporting a superstructure 304 and further includes a pair of spaced apart arms 306, 308 having distal ends extending downwardly from the frame 302. A portion of the arm 306 is visible in FIG. 3 while the entire arm 306 and a portion of the arm 308 are both visible in FIG. 4. In this embodiment, a supply line (not shown) having an outlet at the distal end of the arms for supplying additional liquid (typically water) during operation of the reconditioning apparatus 300 may run along or through one or both of the arms 306 and 308. In one embodiment a pair of 50 mm supply lines may be routed down each of the arms 306, 308 for delivering additional water to the media at outlets proximate distal ends of the arms.

The reconditioning apparatus 300 also includes an agitator 310 extending between the distal ends of the pair of arms 306 and 308. The agitator 310 has a plurality of tines 312 for sub-surface tilling of the media 122. The agitator 310 is coupled via a drivetrain 314 to a drive system 316 disposed within the superstructure 304. In the embodiment shown the drive system 316 is implemented in part using a hydraulic motor 318 where each arm 306, 308 has an associated hydraulic motor.

The reconditioning apparatus 300 also includes a coupling 324, 326 for connection to a propulsion unit (not shown). The propulsion unit is operable to draw the frame 302 and reconditioning apparatus 300 through the effluent treatment bed 100. In one embodiment the propulsion unit comprises a skid loader, which may be further operable to supply pressurized hydraulic fluid to the reconditioning apparatus 300 for driving the hydraulic motor 318 of the drive system 316. The loader arms of the skid loader may be connected to the coupling 324, 326 and the skid loader may be reversed through the effluent treatment bed 100 to draw the reconditioning apparatus 300 through the bed. In the embodiment shown the reconditioning apparatus 300 includes a pair of lateral guides 334 and 336 that are operable to prevent undesired lateral movement of the reconditioning apparatus. The lateral guides 334 and 336 provide a resistance to lateral motion and cause the reconditioning apparatus 300 to move in a substantially forward direction.

The reconditioning apparatus 300 further includes a lifter bar 322 disposed between the arms 306 and 308 above the agitator 310. In this embodiment the lifter bar 322 is mounted on a pair of side plates 328 and 330 connected to the frame 302 so as to define an open channel 332 through the reconditioning apparatus 300. In this embodiment the lifter bar 322 is mounted in fixed relation to the frame 302 and superstructure 304. In other embodiments the lifter bar 322 may have height that is adjustable relative to the frame 302.

Figure 5:
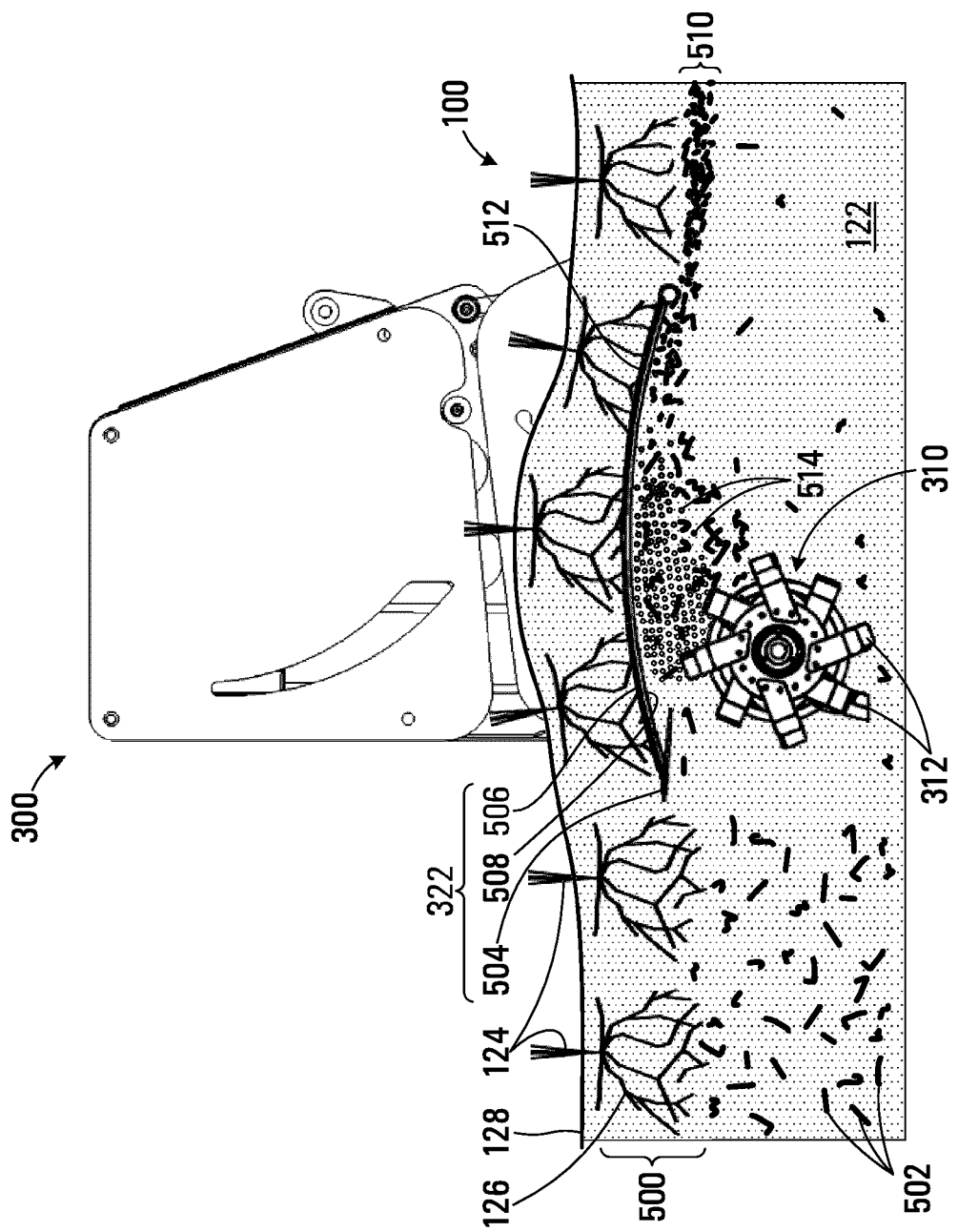
FIG. 5 is a cross sectional view of the apparatus shown in FIG. 3 and FIG. 4 disposed for reconditioning of media in the effluent treatment bed shown in FIG. 1.

The reconditioning apparatus 300 is shown in FIG. 5 in a cross sectional view disposed for reconditioning of the media 122. Referring to FIG. 5, the reconditioning apparatus 300 may be initially moved to a portion of the effluent treatment bed 100 that is to be reconditioned by the propulsion unit (not shown). The reed plants 124 are initially cropped off just above the surface 128 of the effluent treatment bed 100 so that they do not impede motion of the reconditioning apparatus 300 over the surface. The standpipes 214 and 216 may be adjusted to raise the level of effluent in the treatment bed 100 above the surface 128, thus providing additional liquid during reconditioning. In the example shown the media 122 of the treatment bed 100 has a significant proportion of clogging matter 502 that will generally impede passage of effluent through the bed.

The reconditioning apparatus 300 will initially be disposed with the agitator 310 above the surface 128 of the bed 100 and may be shuttled back and forth while causing rotation of the agitator 310 in a series of forward and reverse motions to cause the tines 312 to engage the media 122 and draw the agitator 310 deeper into the bed. When the agitator 310 is disposed below a primary root zone 500 of the cropped reed plants 124 and the lifter bar 322 is disposed at a depth proximate the bottom of the primary root zone 500, the reconditioning apparatus 300 is ready to begin reconditioning operations. The roots 126 of a portion of the reed plants 124 passing between the side plates 324 and 326 (FIG. 4) are engaged by a leading edge 504 of the lifter bar 322 and the rotating tines 312 of the agitator 310, thus separating the primary root zone 500 from secondary roots of the reeds extending below the primary root zone 500 into the media 122 below the lifter bar. An upwardly arched surface 506 following the leading edge 504 of the lifter bar 322 causes the primary root zone 500 of the reed plants 124 and the surface 128 of the bed 100 to be lifted to provide additional space below the lifter bar for tilling of the media by the agitator 310 and to permit separated clogging matter to accumulate below the lifter bar. The reconditioning apparatus 300 also includes a downwardly arched surface 512 at a trailing edge of the lifter bar 322 that lowers the separated primary root zone 500 back into contact with the media 122.

The lifter bar 322 thus passes through the bed 100 below a primary root zone 500 of the reeds and is operably configured to lift and separate the primary root zone while the agitator 310 tills the media below the primary root zone to cause the clogging matter 502 to be released and separated from the media 122. Additional water may be injected into the clogged media below the primary root zone 500 via the water supply lines extending along the arms 306, 308. The additional water in combination with water provided by flooding the effluent treatment bed 100 increases the overall water proportion to make the media 122 easier to till and promotes separation of the clogging matter 502 by flotation. The separated clogging matter 502 floats upwardly within the media 122 toward an underside 508 of the lifter bar 322 and accumulates in a layer 510, which may be only a few centimeters thick. In some embodiments, a suction system may be provided to draw off at least a portion of the accumulated layer 510 of clogging matter, but in other embodiments the clogging matter may be left within the bed 100. Once the primary root zone 500 of the reed plants 124 have passed over the lifter bar 322, the primary root zone 500 is lowered back onto the media 122 below and the roots 126 are able to propagate into the media below through the accumulated layer 510 of clogging matter if still present.

Referring back to FIG. 4, in the embodiment shown the arm 306 is mounted to the frame 302 via an arm extension system 400. The arm extension system 400 includes a beam 402 pivotably attached to the frame 302 at a pivot point 404 and a hydraulic cylinder 406 having mounted between the frame and the beam 402. The arm 306 is coupled to the beam 402 at a connection point 408. A lower support plate 410 is mounted between an end cap 412 of the agitator 310 at a lower end of the arm 306 and the frame via a pivoting mechanism 414. The lower support plate 410 is shown as transparent in FIG. 4 to reveal components of the arm extension system 400. When the hydraulic cylinder 406 is retracted the beam 402 is lowered about the pivot point 404 lowering the connection point 408 and upper end of the arm 306 with respect to the frame 302. The lower support plate 410 moves downwardly, while maintaining the arm 306 in a substantially vertical orientation with respect to the frame 302. Similarly, when the hydraulic cylinder 406 is extended the beam 402 is raised about the pivot point 404 raising the connection point 408 and upper end of the arm 306 with respect to the frame 302 while the lower support plate 410 moves upwardly to maintain the arm 306 in a substantially vertical orientation w.r.t. to the frame 302.

The arm 308 may be similarly configured and actuated as described above in connection with the arm 306 such that the arms are operably configured to be moveable upwardly or downwardly with respect to the frame to facilitate adjustment of a depth of the agitator 310 within the bed.

As described above in connection with FIG. 3, the reconditioning apparatus 300 includes a drive system 316 for actuating rotation of the agitator 310. Components of the drive system 316 are shown in FIG. 4 and include an upper sprocket 420 at an upper end of the arm 306, which is driven by the hydraulic motor 318 (shown in FIG. 3). The drive system 316 also includes a chain 422, extending between the upper sprocket 420 and a lower sprocket behind the end cap 412 (not visible in FIG. 4). The chain 422 transmits a torque generated by the hydraulic motor 318 to the lower sprocket, thus causing rotation of the agitator 310.

In the embodiment shown, power for operating the hydraulic motor 318 is provided by a pressurized flow of hydraulic fluid provided by the propulsion unit. In this embodiment the reconditioning apparatus 300 includes a hydraulic flow divider 338 that delivers substantially the same hydraulic fluid flow to the hydraulic motor on each of the arms 306 and 308 so that the agitator 310 receives a substantially equal torque from each arm. In one embodiment the flow of hydraulic fluid may be in the region of about 35 Us gallons per minute (135 liter per minute), which at a pressure of 2400 psi or 16500 kPa would deliver a total power of about 50 horsepower to the agitator 310. In other embodiments, the hydraulic fluid supply may be generated onboard the reconditioning apparatus 300 or may be provided via a hydraulic fluid line from a hydraulic generator other than the hydraulic generator of the propulsion unit. Alternatively, a drive torque for driving the agitator 310 may be provided by and electric motor, gas, or diesel powered motor disposed within the superstructure 304 of the reconditioning apparatus 300 and coupled to the upper sprocket 420.

In the embodiment shown, the agitator 310 includes a hollow shaft 430 having a plurality of annular flanges 432 welded to the shaft, each supporting a plurality of the tines 312. Additionally in one embodiment the hollow shaft 430 includes a plurality of air outlets 434 disposed between the annular flanges 432. In one embodiment a flow of air is delivered to the hollow shaft and introduced through the plurality of air outlets 434 into the media 122 below the primary root zone 500. The air flow may be generated by a blower (not shown) disposed within the superstructure 304 of the reconditioning apparatus 300 and channeled down one of the arms 306, 308 to the hollow shaft 430 of the agitator 310. The blower may be implemented as an electric of gas-powered blower unit for example. The air introduced through the plurality of air outlets 434 passes through the water in the tilled media 122 and promotes separation of the clogging matter 502 by flotation. Referring back to FIG. 5, a plurality of air bubbles 514 introduced through the air outlets 434 in the hollow shaft 430 while moving through the gravel of the media 122 assist by causing flotation of the generally less dense clogging matter.

In some embodiments, following reconditioning of the media 122 the primary root zone 500 of the reed plants 124 is returned into contact with the reconditioned media and the accumulated layer 510 of clogging matter is permitted to remain in the effluent treatment bed 100. The roots 126 of the reed plants 124 over time will propagate through the thin accumulated layer 510 of clogging matter and reestablish within the media 122 below the primary root zone 500.

In an alternative embodiment, the reconditioning apparatus 300 may include an intake disposed below the downwardly arched surface 512 of the lifter bar 322, the intake being in communication with a pump operable to draw off water and at least a portion of the clogging material 502 in the accumulated layer 510 that has been separated from the media. The removed clogging material 502 may thus be removed from the effluent treatment bed 100 and disposed of.

In some cases it may be desirable to completely remove the cropped reed plants 124 and the primary root zone 500 from the effluent treatment bed 100. In one embodiment, a sled (not shown) may be coupled to a rear portion of the reconditioning apparatus 300 trailing the upwardly arched surface 506 of the lifter bar 322. After separation and lifting by the upwardly arched surface 506, the separated reed plants 124 may be deposited on the sled. The sled may have a width corresponding to a width of the lifter bar 322 and once loaded with a manageable quantity of reed plants 124 may be removed from the bed 100, and replaced with an empty sled. In this way the reed plants 124 in an effluent treatment bed 100 may be effectively removed. Following removal and reconditioning, new vegetation may be planted.

While specific embodiments have been described and illustrated, such embodiments should be considered illustrative only and not as limiting the disclosed embodiments as construed in accordance with the accompanying claims.

What is claimed is:

1. An apparatus for in-situ reconditioning of a media used in an effluent treatment bed in which passage of effluent has become impeded by clogging matter within the media, the bed being planted with vegetation having roots extending into the media, the apparatus comprising:
   a frame supporting a superstructure operable to be disposed above a surface of the bed when in operation;
   a pair of spaced apart arms having distal ends extending downwardly from the frame;
   an agitator extending between the distal ends of the pair of arms and having a plurality of tines for sub-surface tilling of the media, the agitator being coupled via a drivetrain to a drive system disposed within the superstructure and operable to cause rotation of the agitator; and
   a lifter bar disposed between the pair of arms above the agitator such that, when the frame is advanced through the bed, the lifter bar passes through the bed below a primary root zone of the vegetation, the lifter bar being operably configured to:
      lift and separate the primary root zone relative to a depth of the agitator within the bed while the agitator tills the media below the primary root zone to cause clogging matter to be separated from the media; and
      lower the lifted primary root zone relative to the depth of the agitator after the agitator tills the media below the lifted primary root zone.

2. The apparatus of claim 1 wherein at least one of the pair of arms comprises a liquid outlet disposed proximate the distal end and operable to introduce liquid into the media below the primary root zone, the introduced liquid being operable to combine with water already within the bed to increase a liquid proportion of the bed to promote separation of the clogging matter by flotation.

3. The apparatus of claim 1 wherein the agitator comprises a plurality of air outlets disposed to introduce air into the media below the primary root zone, the introduced air being operable to bubble through water in the tilled media to promote separation of the clogging matter by flotation.

4. The apparatus of claim 1 wherein each of the pair of arms are operably configured to be moveable upwardly or downwardly with respect to the frame to facilitate adjustment of the depth of the agitator.

5. The apparatus of claim 1 wherein the lifter bar comprises:
   a leading edge that separates the primary root zone of the vegetation from secondary roots of the vegetation extending into the media; and
   an upwardly arched surface following the leading edge that causes the primary root zone to be lifted relative to the depth of the agitator to provide additional space below the lifter bar for tilling of the media below the primary root zone by the agitator and to permit separated clogging matter to accumulate below the lifter bar.

6. The apparatus of claim 5 further comprising:
a sled coupled to the frame and disposed trailing the upwardly arched surface of the lifter bar, the sled being operable to receive the primary root zone of the vegetation; or
a downwardly arched surface following the upwardly arched surface that causes the lifted primary root zone to be lowered relative to the depth of the agitator to bring the lifted primary root zone back into contact with the tilled media.

7. The apparatus of claim 1 wherein the frame comprises a coupling for connection to a propulsion unit, the propulsion unit being operable to draw the frame through the bed.

8. The apparatus of claim 7 wherein the propulsion unit is operable to supply drive power to the drive system.

9. The apparatus of claim 1 further comprising at least one intake disposed below the lifter bar and in communication with a pump operable to draw off water and clogging material separated from the media.

10. The apparatus of claim 8 wherein the propulsion unit comprises a hydraulic fluid pump and wherein the drive power is supplied by supplying a flow or pressurized hydraulic fluid to the apparatus, and wherein the drive system comprises at least one hydraulic motor disposed within the superstructure and operable to deliver the drive power to the drivetrain.

11. A method for in-situ reconditioning of a media used in an effluent treatment bed in which passage of effluent has become impeded by clogging matter within the media, the bed being planted with vegetation having roots extending into the media, the method comprising:
causing a lifter bar of a reconditioning apparatus to be positioned within the media below a primary root zone of the vegetation such that an agitator of the reconditioning apparatus is in engagement with the media below the primary root zone, the agitator extending between distal ends of a pair of arms extending downwardly from a frame of the reconditioning apparatus and having a plurality of tines for sub-surface tilling of the media; and
causing the frame of the reconditioning apparatus to be advanced through the bed such that, as the lifter bar passes through the bed below the primary root zone of the vegetation, the lifter bar is configured to:
lift and separate the primary root zone relative to a depth of the agitator within the bed while the agitator tills the media below the primary root zone to separate clogging matter from the media; and
lower the lifted primary root zone relative to the depth of the agitator and back into contact with the tilled media after the agitator tills the media below the primary root zone.

12. The method of claim 11 further comprising causing flotation of the clogging matter by introducing liquid into the media below the primary root zone.

13. The method of claim 11 further comprising causing flotation of the clogging matter by introducing air into the media below the primary root zone.

14. The method of claim 11 further comprising adjusting a depth of the lifter bar to a depth corresponding to a depth of the primary root zone of the vegetation.

15. The method of claim 11 further comprising adjusting the depth of the agitator to a depth corresponding to a depth of the media below the primary root zone.

16. The method of claim 11 further comprising drawing off water and clogging material that has been separated from the media at a location below the lifter bar.

17. The apparatus of claim 1 wherein the agitator further comprises a shaft extending between the distal ends of the pair of arms, wherein the plurality of tines extend from the shaft and wherein both the shaft and the plurality of tines are disposed below the primary root zone while the agitator tills the media below the primary root zone.

18. The apparatus of claim 17 wherein the shaft of the agitator includes a plurality of air outlets disposed to introduce air into the media below the primary root zone.

19. The method of claim 11 wherein the lifter bar comprises:
a leading edge that separates the primary root zone of the vegetation from secondary roots of the vegetation extending into the media;
an upwardly arched surface following the leading edge that causes the primary root zone to be lifted relative to the depth of the agitator to provide additional space below the lifter bar for tilling of the media below the primary root zone by the agitator and to permit separated clogging matter to accumulate below the lifter bar; and
a downwardly arched surface following the upwardly arched surface that causes the lifted primary root zone to be lowered relative to the depth of the agitator to bring the lifted primary root zone back into contact with the tilled media.

20. The method of claim 11 wherein the agitator further comprises a shaft extending between the distal ends of the pair of arms, wherein the plurality of tines extend from the shaft and wherein both the shaft and the plurality of tines are disposed below the primary root zone while the agitator tills the media below the primary root zone, the method further comprising:
introducing air into the media below the primary root zone via a plurality of air outlets disposed in the shaft of the agitator, the introduced air operable to bubble through water in the tilled media to promote separation of the clogging matter by flotation.

* * * * *